United States Patent Office 2,867,899

Patented Jan. 13, 1959

2,867,899

METHOD OF SOLDERING GERMANIUM DIODES

Bernard Jacobs, Clifton, N. J., assignor to International Telephone and Telegraph Corporation, a corporation of Maryland No Drawing. Application June 26, 1953
Serial No. 364,496

2 Claims. (Cl. 29—494)

This invention relates to semiconducting crystal elements, such as germanium, and particularly to a method of soldering electrodes to the crystal elements.

Electrical crystal devices such as crystal diodes, triodes, etc., generally comprise at least one electrode soldered to the crystal element. According to the prior art, one method of soldering the electrode to the crystal, to make suitable ohmic contact therebetween, requires the use of a flux to remove the metal oxide film from the crystal. However, certain crystals, such as germanium, are extremely sensitive to impurities and contaminations, and therefore, after the soldering operation, the crystal must be thoroughly washed and dried to remove the impurities introduced by the flux. This, of course, is undesirable because it increases the number of operations required to manufacture the crystal device which consequently increases the cost thereof. Another method of soldering the electrode to the crystal requires the use of an intermediate plated layer between the crystal and the electrode. According to this method a metal layer, preferably the same metal as the electrode, is plated onto the crystal surface and then the electrode is soldered in the conventional manner to this layer. However, in this latter method the metal layer often alters the electrical characteristics of the crystal, and as in the first method, additional operational steps are necessitated to provide suitable contact. Another disadvantage common to each of the above mentioned methods is that the forward conductivity obtainable from the device is not as high as is often desired. For example, the average forward current obtainable with most known germanium diodes, constructed in accordance with the prior art methods, is approximately 5 to 10 milliamperes at 1 volt.

It is an object of this invention to provide a unique method of soldering an electrode to a semiconductor which is not subject to many of the disadvantages of the prior art. In particular, the method is one which obviates the requirement for a flux or an intermediate metal layer.

It is a further object of the invention to provide a crystal device having a forward conductivity many times greater than the maximum obtainable from devices constructed in accordance with the prior art methods.

In accordance with a main feature of the invention, the advantages are achieved by soldering the electrode to the crystal in an inert atmosphere.

In accordance with another aspect of the invention, I adhere the electrode to the semiconductor (crystal) solely by solder.

The above-mentioned and other features and objects of this invention and the manner of attaining them will become more apparent and the invention itself will be best understood, by reference to the following description of an embodiment of the invention.

As pointed out above the known methods of making ohmic contacts between the semiconductor element and the electrodes consist in soldering with the aid of a flux to remove the metal oxide film. In accordance with the invention, ohmic contacts can be made directly to the semiconductor without the use of plating or of flux by soldering in an inert atmosphere. Excellent contact is obtained because when the soldering is done in an inert atmosphere, no oxide film can form to act as a barrier between the soldered parts and fusion can take place between the semiconductors and the solder.

According to one method of applying the solder to the semiconductor, there is melted a large excess of solder in an inert atmosphere and the semiconductor is floated on the top of the molten solder. In this manner sufficient solder adheres to the semiconductor upon its removal to permit its application to a base electrode without the usual additional tinning operation of the electrode.

According to another method, an electrode may be soldered to a semiconductor by applying a bead or a wafer of solder to an end of the electrode, then placing the semiconductor in contact with the solder and melting the solder in an inert atmosphere to permit fusion between the solder and semiconductor.

The solder can, of course, be modified to include donor or acceptor type metals, such as indium for acceptor type and antimony for donor type in the amounts necessary to obtain p-n junctions. For example, the use of small amounts of antimony in the solder aids in forming a heavy concentration of n-type germanium (where n-type germanium is used as the semiconductor) at the contact area which is of the high conducting type.

In accordance with the principles of my invention great improvement in the forward conductivity has been obtained when germanium is used in rectifier devices. For example, point contact rectifiers made of 5 ohm-cm. germanium have yielded forward conductivities as high as 40 ma. at 1 volt, as compared with 5 to 10 ma. at 1 volt attained with the prior art devices. The same technique has also been successfully used in the making of the junction type power diodes and transistors.

By way of one example, I have used solder consisting of 35% tin, 63% lead, 2% antimony, melted at 400° C., in an atmosphere of nitrogen to solder a germanium crystal to an electrode tinned with a standard solder consisting of 65% tin, 35% lead.

It is to be understood that although the base itself may be pre-tinned as a convenience and ease in soldering, the same technique may be used for soldering directly to an untinned base.

I do not think any further examples are necessary as the technique could apply to practically any composition solder or any base to be soldered too.

While I have described above the principles of my invention in connection with specific compositions, it is to be clearly understood that this description is made only by way of example and not as a limitation to the scope of my invention as set forth in the objects thereof and in the accompanying claims.

What is claimed is:

1. A method of soldering an electrode to a semiconductor element, comprising melting solder in an inert atmosphere to prevent oxidation of the solder, floating the semi-conductor element on said molten solder, removing the semi-conductor element from the molten solder whereby a thin layer of solder is adhered thereto, mounting the electrode on said thin layer, and melting said thin layer to bond the electrode thereto.

2. The method according to claim 1, and further comprising adding an impurity selected from the class consisting of donors and acceptors to the molten solder, which will affect the conductivity of the semi-conductor element.

(References on following page)

References Cited in the file of this patent

UNITED STATES PATENTS

| | | |
|---|---|---|
| 2,094,287 | Zimmerman et al. | Sept. 28, 1937 |
| 2,145,168 | Flagg | Jan. 24, 1939 |
| 2,321,071 | Ehrhardt et al. | June 8, 1943 |
| 2,381,025 | Addink | Aug. 7, 1945 |
| 2,402,661 | Ohl | June 25, 1946 |
| 2,406,310 | Agule | Aug. 27, 1946 |
| 2,534,643 | Warner | Dec. 19, 1950 |
| 2,555,001 | Ohl | May 29, 1951 |
| 2,603,693 | Kircher | July 15, 1952 |
| 2,623,102 | Schockley | Dec. 23, 1952 |
| 2,629,672 | Sparks | Feb. 24, 1953 |
| 2,644,852 | Dunlap | July 7, 1953 |
| 2,703,296 | Teal | Mar. 1, 1955 |
| 2,802,995 | Mautone et al. | Aug. 13, 1957 |

FOREIGN PATENTS

| | | |
|---|---|---|
| 592,733 | Great Britain | May 30, 1945 |